US008954076B2

(12) United States Patent
Lim et al.

(10) Patent No.: US 8,954,076 B2
(45) Date of Patent: Feb. 10, 2015

(54) COOPERATIVE COMMUNICATION BETWEEN TERMINALS IN WIRELESS COMMUNICATION SYSTEM SUPPORTING MULTI-RADIO ACCESS TECHNOLOGY

(75) Inventors: Dongguk Lim, Anyang-si (KR); Hangyu Cho, Anyang-si (KR); Kyujin Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 168 days.

(21) Appl. No.: 13/806,662

(22) PCT Filed: Jun. 24, 2011

(86) PCT No.: PCT/KR2011/004633
§ 371 (c)(1),
(2), (4) Date: Dec. 21, 2012

(87) PCT Pub. No.: WO2011/162572
PCT Pub. Date: Dec. 29, 2011

(65) Prior Publication Data
US 2013/0095821 A1    Apr. 18, 2013

Related U.S. Application Data

(60) Provisional application No. 61/357,991, filed on Jun. 24, 2010.

(51) Int. Cl.
*H04W 36/00* (2009.01)
*H04J 1/16* (2006.01)
(Continued)

(52) U.S. Cl.
CPC .......... *H04W 72/04* (2013.01); *H04W 72/0406* (2013.01); *H04L 5/0035* (2013.01); *H04W 88/04* (2013.01)

USPC .......... 455/436; 455/437; 370/252; 370/329; 370/349

(58) Field of Classification Search
USPC ............... 455/422.1, 450, 436–437; 370/254, 370/260, 329, 349, 252
See application file for complete search history.

(56) References Cited

U.S. PATENT DOCUMENTS 8,787,268 B2 * 7/2014 Yoshii et al. ................... 370/329
2007/0002821 A1 * 1/2007 Carlson et al. ................ 370/349
(Continued)

FOREIGN PATENT DOCUMENTS

KR    10-2009-0098568    9/2009

OTHER PUBLICATIONS

Yu Wei, et al., "A Utility-based Capacity Optimization Framework for Achieving Cooperative Diversity in the Hierarchical Converged Heterogeneous Wireless Networks", A Relay Nodes Selection Mechanism in Heterogeneous Cooperative Communication Systems, Jul. 2008, 9 pages (Relevant portions: Sections I-II and Fig. 1).

(Continued)

*Primary Examiner* — Inder Mehra
(74) *Attorney, Agent, or Firm* — Lee, Hong, Degerman, Kang & Waimey

(57) ABSTRACT

Disclosed is a method for executing communication in a wireless communication system supporting multi-radio access technology, through cooperation between a first terminal requesting terminal cooperation and a second terminal accepting terminal cooperation. The method comprises: a step for the first terminal to transmit to a base station resource allocation request information on the uplink transmission of the second terminal; a step for the second terminal to receive from the base station a first uplink grant (UL grant) as a response to the resource allocation request information; a step for the first terminal to transmit data to the second terminal; and a step for the second terminal to transmit to the base station the data received from the first terminal using the resource allocated by the first UL grant.

9 Claims, 14 Drawing Sheets

(51) Int. Cl.
*H04J 3/24* (2006.01)
*H04L 12/28* (2006.01)
*H04W 4/00* (2009.01)
*H04W 72/04* (2009.01)
*H04L 5/00* (2006.01)
*H04W 88/04* (2009.01)

(56) References Cited

U.S. PATENT DOCUMENTS

| | | | |
|---|---|---|---|
| 2007/0115862 A1* | 5/2007 | Lee et al. | 370/260 |
| 2009/0097442 A1* | 4/2009 | Diab et al. | 370/329 |
| 2011/0164587 A1* | 7/2011 | Seo | 370/329 |
| 2011/0314161 A1* | 12/2011 | Andreasen et al. | 709/226 |
| 2012/0015659 A1* | 1/2012 | Kalyani et al. | 455/436 |
| 2012/0026949 A1* | 2/2012 | Kotecha | 370/329 |
| 2012/0114062 A1* | 5/2012 | Zhang et al. | 375/285 |
| 2012/0213120 A1* | 8/2012 | Chen | 370/254 |
| 2012/0269153 A1* | 10/2012 | Seo et al. | 370/329 |

OTHER PUBLICATIONS

Nageen Himayat, et al., "Heterogeneous Networking for Future Wireless Broadband Networks", IEEE 802.16 Presentation Submission Template (Rev. 9), IEEE C802.16-10/0003, 14 pages, Jan. 2010.

* cited by examiner

FIG. 6

|  |  |  |  |  |  |
|---|---|---|---|---|---|
| Pr0 | Pr4 | Pr8 | Pr12 | Pr16 | Pr20 |
| Pr1 | Pr5 | Pr9 | Pr13 | Pr17 | Pr21 |
| M0 | M6 | M12 | M18 | M24 | M30 |
| M1 | M7 | M13 | M19 | M25 | M31 |
| Pr2 | Pr6 | Pr10 | Pr14 | Pr18 | Pr22 |
| Pr3 | Pr7 | Pr11 | Pr15 | Pr19 | Pr23 |

|  |  |  |  |  |  |
|---|---|---|---|---|---|
| Pr0 | Pr4 | Pr8 | Pr12 | Pr16 | Pr20 |
| Pr1 | Pr5 | Pr9 | Pr13 | Pr17 | Pr21 |
| M2 | M8 | M14 | M20 | M26 | M32 |
| M3 | M9 | M15 | M21 | M27 | M33 |
| Pr2 | Pr6 | Pr10 | Pr14 | Pr18 | Pr22 |
| Pr3 | Pr7 | Pr11 | Pr15 | Pr19 | Pr23 |

|  |  |  |  |  |  |
|---|---|---|---|---|---|
| Pr0 | Pr4 | Pr8 | Pr12 | Pr16 | Pr20 |
| Pr1 | Pr5 | Pr9 | Pr13 | Pr17 | Pr21 |
| M4 | M10 | M16 | M22 | M28 | M34 |
| M5 | M11 | M17 | M23 | M29 | M35 |
| Pr2 | Pr6 | Pr10 | Pr14 | Pr18 | Pr22 |
| Pr3 | Pr7 | Pr11 | Pr15 | Pr19 | Pr23 |

COOPERATIVE COMMUNICATION BETWEEN TERMINALS IN WIRELESS COMMUNICATION SYSTEM SUPPORTING MULTI-RADIO ACCESS TECHNOLOGY

CROSS-REFERENCE TO RELATED APPLICATIONS

This application is the National Stage filing under 35 U.S.C. 371 of International Application No. PCT/KR2011/004633, filed on Jun. 24, 2011, which claims the benefit of U.S. Provisional Application Ser. No. 61/357,991, filed on Jun. 24, 2010, the contents of which are all hereby incorporated by reference herein in their entirety.

BACKGROUND OF THE INVENTION

1. Field of the Invention

The present invention relates to a wireless communication system, and more particularly, to an apparatus and method for performing cooperative communication between terminals.

2. Related Art

A wireless environment employs various radio access technologies (RATs) to support several types of terminals, and heterogeneous networks using various types of RATs have been introduced in recent years. For further effective communication, the terminals can support a multi-RAT without being limited to a specific RAT.

In addition, a data transmission method is introduced which uses cooperative communication between terminals existing in a cell. The cooperative communication between the terminals is called client cooperation (CC), and allows data to be transmitted to a destination through multiple paths formed when two or more terminals share their resources.

There is a need to define an operation procedure and signaling for effective transmission between the terminals supporting the multi-RAT and the CC.

SUMMARY OF THE INVENTION

Embodiments of the present invention are for providing a method of performing cooperative communication between terminals in an environment supporting various radio access technologies (RATs). For this, certain embodiments of the present invention provide a method in which a terminal intending to transmit data requests resource allocation for uplink transmission for another terminal which is in a cooperative relation. In addition, certain embodiments of the present invention provide a method in which resource allocation for uplink data transmission is requested by another terminal which is in a cooperative relation.

In an aspect, a method of performing communication in a wireless communication system supporting a multi-radio access technology (RAT) through cooperation between a first terminal requesting client cooperation (CC) and a second terminal accepting the CC is provided. The method includes transmitting, by the first terminal, resource allocation request information regarding uplink (UL) transmission of the second terminal to a base station, receiving, by the second terminal, a first UL grant in response to the resource allocation request information from the base station, transmitting, by the first terminal, data to the second terminal, and transmitting, by the second terminal, to the base station the data received from the first data by using a resource allocated by the first UL grant.

The aforementioned aspect or other aspects may include one or more features described below.

The first terminal and the second terminal may communicate with the base station by using a first RAT, and the first terminal and the second terminal may communicate with each other by using a second RAT. The first RAT may be 802.16m, and the second RAT may be Wi-Fi.

The resource allocation request information may be transmitted to the base station before the data transmission. The first terminal may transmit the data to the second terminal by fragmenting the data, and the resource allocation request information may be transmitted to the base station during the fragmented data is transmitted to the second terminal. The resource allocation request information may be transmitted to the base station after the data transmission.

The method may further include receiving a second UL grant from the base station before the first terminal transmits the resource allocation request information, and the resource allocation request information may be transmitted by using a resource allocated by the second UL grant.

The resource allocation request information may be included in a cooperation request message, and the first UL grant may be received by being included in a cooperation response message transmitted from the base station in response to the cooperation request message. The cooperation response message may further include information on the CC between terminals including the first terminal and the second terminal. The information on the CC includes an execution mode, and the execution mode may include a first mode in which data is transmitted through relaying between the cooperative terminals and a second mode in which at least two or more terminals simultaneously transmit data. The method may further include transmitting, by the first terminal, the data to the base station if the execution mode indicates the second mode.

The cooperation request message may include an indicator for confirming whether to perform the CC, and if the indicator indicates that the first terminal performs the CC, the method may further include activating the second RAT.

In another aspect, a method of performing communication in a wireless communication system supporting a multi-radio access technology (RAT) through cooperation between a first terminal requesting client cooperation (CC) and a second terminal accepting the CC is provided. The method includes receiving, by the second terminal, a cooperation response message from a base station, requesting, by the second terminal, the base station to transmit uplink (UL) resource allocation information in order to transmit UL data of the first terminal to the base station, receiving, by the second terminal, a UL grant for the UL resource allocation request from the base station, receiving, by the second terminal, data from the first terminal, and transmitting, by the second terminal, the data received from the first terminal to the base station by using the UL grant.

The aforementioned aspect or other aspects may include one or more features described below.

The method may further include transmitting, by the first terminal, a cooperation request message to the base station.

The first terminal and the second terminal may communicate with the base station by using a first RAT, and the first terminal and the second terminal may communicate with each other by using a second RAT.

The cooperation response message may include at least one of resource region information used to request the UL resource allocation information by the second terminal and an indicator indicating a turn-on or turn-off of the second RAT.

The requesting of the UL resource allocation information may be performed before, during, or after the second terminal receives data from the first terminal.

In another aspect, a first terminal for performing communication in a wireless communication system supporting a multi-radio access technology (RAT) through cooperation between the first terminal requesting client cooperation (CC) and a second terminal accepting the CC is provided. The first terminal includes a first transceiver for communicating with a base station by using a first RAT, a second transceiver for communicating with the second terminal by using a second RAT, and a processor configured for transmitting resource allocation request information for uplink (UL) transmission of the second terminal to the base station, for receiving a UL grant from the base station in response to the resource allocation request information, for transmitting data to the second terminal, and for transmitting the UL grant to the second terminal so that the second terminal transmits the data to the base station.

According to certain embodiments of the present invention for cooperative communication between terminals, a first terminal which intends to deliver data in a radio access technology (RAT) environment can request a base station to allocate an uplink radio resource for a second terminal. In this case, the second terminal can transmit the data to the base station by using the allocated radio resource.

In addition, according to other embodiments of the present invention for cooperative communication between terminals, a second terminal which is in a cooperative relation with a first terminal intending to deliver data can request allocation of a radio resource to deliver the data to a base station.

In addition, a terminal conforming to certain embodiments of the present invention can transmit data to a different terminal by using a second RAT different from a first RAT supported by a base station, and the different terminal can transmit the received data to the base station by using a radio resource allocated for the first RAT.

In addition, according to certain embodiments of the present invention, a first terminal which intends to transmit data to a base station supporting a first RAT or a second terminal which is in a cooperative relation with the first terminal can request uplink resource allocation before, during, or after performing data delivery.

BRIEF DESCRIPTION OF THE DRAWINGS

FIG. 6 shows an example of one BR channel structure.

DESCRIPTION OF EXEMPLARY EMBODIMENTS

Figure 1:
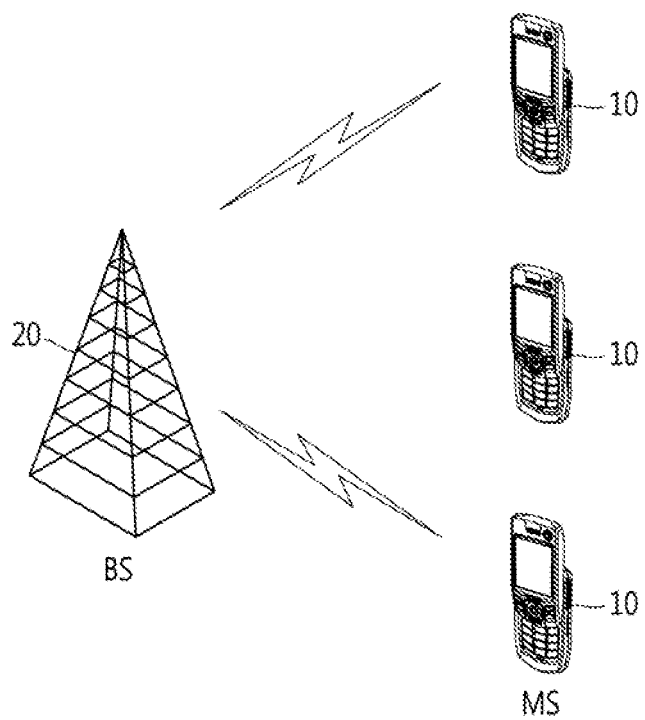
FIG. 1 shows a wireless communication system according to an exemplary embodiment of the present invention.

Hereinafter, embodiments of the present invention will be described in detail with reference to the accompanying drawings. The details to be described hereinafter with reference to the accompanying drawings are not unique embodiments but exemplary embodiments. The details to be described hereinafter include specific aspects to provide perfect understandings of the present invention. However, it will be apparent to those ordinarily skilled in the art that the present invention can be implemented without the specific aspects. For example, although it is described hereinafter that a mobile communication system is a $3^{rd}$ generation partnership project (3GPP) long term evolution (LTE) system, the present invention is also applicable to any other mobile communication system except for an aspect unique to 3GPP LTE.

In some cases, to avoid conceptual ambiguity of the present invention, well-known structures and apparatuses can be omitted, or a block diagram can be illustrated by focusing on a core function of each structure and apparatus. In addition, like reference numerals are used to indicate like elements throughout the present invention.

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e.

The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Machine to Machine (M2M) Communication, Machine Type Communication (MTC)

Hereinafter, M2M will be described in brief.

Machine to Machine (M2M) communication implies communication between one electronic apparatus and another electronic apparatus. That is, it implies communication between objects. Although the M2M communication generally implies wired or wireless communication between electronic apparatuses or communication between a human-controlled apparatus and a machine, it may particularly imply communication between one electronic apparatus and another electronic apparatus, that is, wireless communication between machines. In addition, M2M terminals used in a cellular network have performance or capability inferior to that of typical terminals.

A great number of terminals exist in a cell. The terminals can be distinguished from each other according to a terminal type, class, service type, etc.

For example, according to an operation type of terminals, the terminals can be divided into a terminal for human type communication (HTC) and machine type communication (MTC). The MTC may include communication between M2M devices. Herein, the HTC implies a signal transmission/reception operation in which signal transmission is determined by human interventions, and the MTC implies an operation in which each device autonomously transmits a signal either periodically or in an event-driven manner without human interventions.

In addition, when M2M communication (or MTC communication) is considered, the total number of terminals may be rapidly increased. The M2M terminals may have the following features according to a supported service.

1. A great number of terminals in a cell
2. A small data amount
3. Infrequent transmission (it may have periodicity)
4. A limited number of data features
5. Insensitive to latency
6. Having low mobility or being fixed Terminologies of M2M System Hereinafter, terminologies used in an M2M system will be summarized in brief (1) Machine-to-machine (M2M) communication: Information exchange executable without human intervention between user devices via a BS or between a server and a device in a core network via a BS.

(2) M2M ASN: An access service network capable of supporting an M2M service.

(3) M2M device: A terminal having (or supporting) an M2M function.

(4) M2M subscriber: A consumer of an M2M service.

(5) M2M server: An entity capable of communicating with an M2M device. The M2M server provides an interface accessible by an M2M subscriber.

(6) M2M feature: A unique feature of an M2M application supported by an M2M ASN. One or more features may be necessary to support the application.

(7) M2M group: A group of M2M terminals including common and/or identical M2M subscribers, i.e., sharing one or more features.

Definition on M2M Group ID (MGID) and M2M Terminal (or Device) ID (MDID)

A first identifier for indicating an M2M group to which respective M2M terminals (or M2M devices) belong and a second identifier for identifying the M2M terminals belonging to the M2M group are allocated to the M2M terminals in a system supporting M2M communication. Herein, the first identifier is an identifier used to identify each M2M group in a cell, and the second identifier is an identifier used to identify each M2M device in a group to which the M2M device belongs. That is, the first identifier can be expressed as an M2M group ID, and the second identifier can be expressed as an M2M device ID.

In addition, the first identifier may be used as a primary M2M terminal ID (or a primary M2M device ID), and the second identifier may be used as a secondary M2M terminal ID (or a secondary M2M device ID). For convenience of explanation, the first identifier is used as the M2M group ID, and the second identifier is used as the M2M device ID.

That is, when initial network entry is performed, an M2M group ID and an M2M device ID to be used for communication with the BS are allocated to the M2M terminals by a system supporting M2M communication. Herein, the system supporting M2M communication is the BS or a network entity connected to a network. For example, the network entity may be an M2M server.

Although a 802.16 (particularly, 16m) system is taken as an example in the following description, the method of the present invention is not limited to the 802.16m system, and thus is apparently applied to a system such as LTE, LTE-A, etc.

Wireless Communication System

FIG. 1 shows a wireless communication system according to an exemplary embodiment of the present invention.

The wireless communication system can be widely deployed to provide a variety of communication services, such as voices, packet data, etc.

Referring to FIG. 1, the wireless communication system includes a mobile station (MS) 10 and a base station (BS) 20. The MS 10 may be fixed or mobile, and may be referred to as another terminology, such as a user equipment (UE), a user terminal (UT), a subscriber station (SS), a wireless device, an advanced mobile station (AMS), etc.

Further, the MS 10 may be an M2M or MTC terminal supporting M2M communication.

The BS 20 is generally a fixed station that communicates with the MS 10 and may be referred to as another terminology, such as a node-B, a base transceiver system (BTS), an access point, etc. There may be one or more cells within the coverage of the BS 20.

The wireless communication system may be a system based on orthogonal frequency division multiplexing (OFDM)/orthogonal frequency division multiple access (OFDMA).

The OFDM uses a plurality of orthogonal subcarriers. The OFDM uses an orthogonality between inverse fast Fourier transform (IFFT) and fast Fourier transform (FFT). A transmitter transmits data by performing IFFT on the data. A receiver restores original data by performing FFT on a received signal. The transmitter uses IFFT to combine the plurality of subcarriers, and the receiver uses FFT to split the plurality of subcarriers.

In addition, a slot is a minimum possible data allocation unit, and is defined with a time and a subchannel. In an uplink, a plurality of tiles may construct the subchannel. Six tiles may construct the subchannel. In the uplink, three OFDM symbols and one subchannel may construct one burst.

In case of partial usage of subchannels (PUSC) permutation, each tile may include four contiguous subcarriers on three OFDM symbols. Optionally, each tile may include three contiguous subcarriers on three OFDM symbols. A bin includes 9 contiguous subcarriers on an OFDM symbol. A band denotes a group of four rows of the bin. Six contiguous bins construct an adaptive modulation and coding (AMC) subchannel in the same band.

Block Diagram of MS and BS

Figure 2:
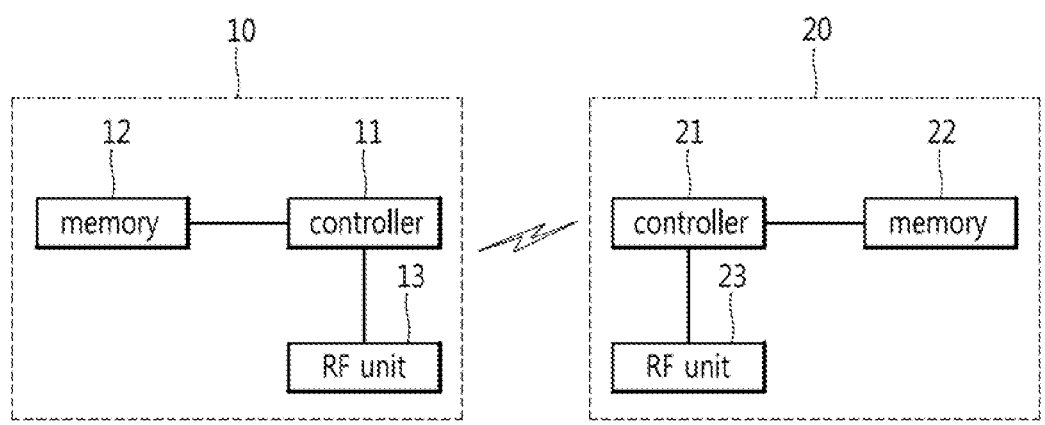
FIG. 2 is a block diagram showing internal structures of an MS and a BS in a wireless access system according to an embodiment of the present invention.

FIG. 2 is a block diagram showing internal structures of an MS and a BS in a wireless access system according to an embodiment of the present invention.

An MS 10 includes a controller 11, a memory 12, and a radio frequency (RF) unit 13.

Further, the MS also includes a display unit, a user interface unit, etc.

The controller 11 implements the proposed functions, procedures, and/or methods. Layers of a wireless interface protocol can be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20 includes a controller 21, a memory 22, and an RF unit 23.

The controller 21 implements the proposed functions, procedures, and/or methods.

Layers of a wireless interface protocol can be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module can be stored in the memories 12 and 22 and can be performed by the controllers 11 and 21.

The memories 12 and 22 can be located inside or outside the controllers 11 and 21, and can be coupled to the controllers 11 and 21 by using various well-known means.

Contention-Based Uplink Resource Allocation Procedure

Figure 3:
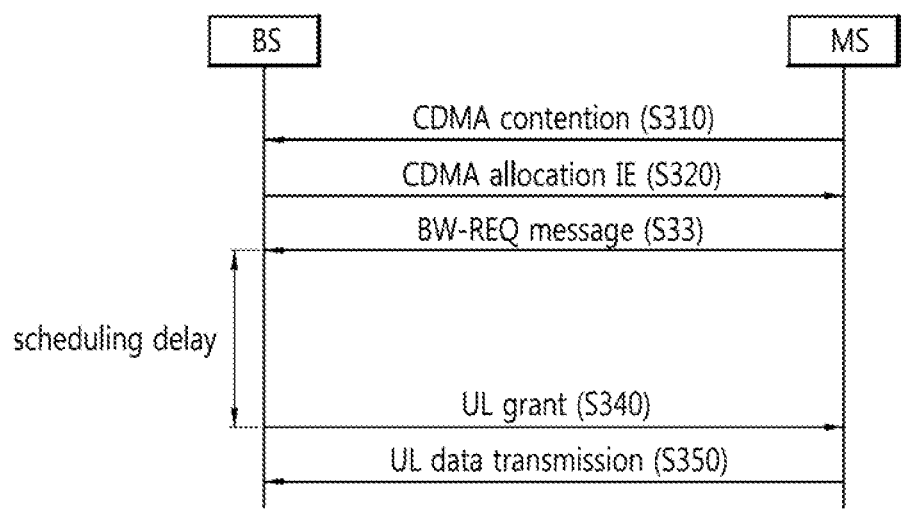
FIG. 3 shows an uplink resource allocation procedure using a contention-based request mechanism.

FIG. 3 shows an uplink resource allocation procedure using a contention-based request mechanism.

Referring to FIG. 3, an MS transmits a randomly selected CDMA code in a slot randomly selected from an area allocated for a bandwidth request (BR) in an uplink (step S310).

If a BS recognizes the CDMA code sent by the MS, the BS allocates a resource to be used by the MS to transmit a BR message by using a CDMA allocation information element (i.e., CDMA_Allocation_IE) (step S320).

Upon receiving information on an uplink resource for transmission of the BR message, the MS transmits the BR message for a corresponding resource region. In this case, the MS can use a BR header, and the header includes information on a BR size or the like (step S330).

If a bandwidth requested by the MS is available, the BS allocates the uplink resource to the MS (step S340).

Thereafter, the MS transmits data by using the allocated uplink resource (step S350).

3-Step Random Access-Based BR Procedure

Figure 4:
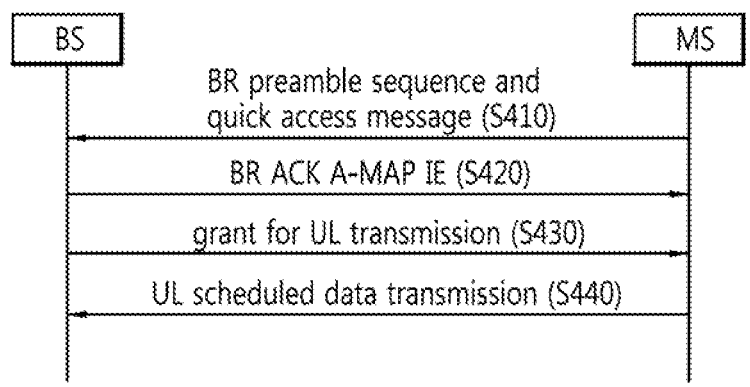
FIG. 4 shows an example of a 3-step random access-based BR procedure.

FIG. 4 shows an example of a 3-step random access-based BR procedure.

In a broadband wireless access system, an MS can use a 3-step or 5-step random access mode. The 5-step random access mode can be used independently from the 3-step random access mode, and can be used as a fall-back mode when the 3-step mode fails.

An advanced mobile station (AMS) transmits a BR preamble sequence and a quick access message to a BS at a randomly selected opportunity (step S410). Herein, the BR preamble sequence can be expressed in a BR code.

In this case, the quick access message may include a station identifier (ID) which is uplink BR information, a BR size, and a BR index indicating QoS, etc.

The BS can transmit to AMSs a BR ACK A-MAP IE indicating a reception state of the BR preamble sequence and quick access message transmitted by each AMS in a broadcast/multicast manner (step S420).

In addition, upon successfully receiving the BR preamble sequence and the quick access message, the BS allocates an uplink resource to each AMS, and transmits uplink resource allocation information to each AMS by using an uplink (UL) basic assignment A-MAP IE (step S430).

The AMS can transmit UL data to the BS by using an allocated UL transmission region. In this case, the AMS can also transmit additional BR information to the BS (step S440).

5-Step Random Access-Based BR Procedure

Figure 5:
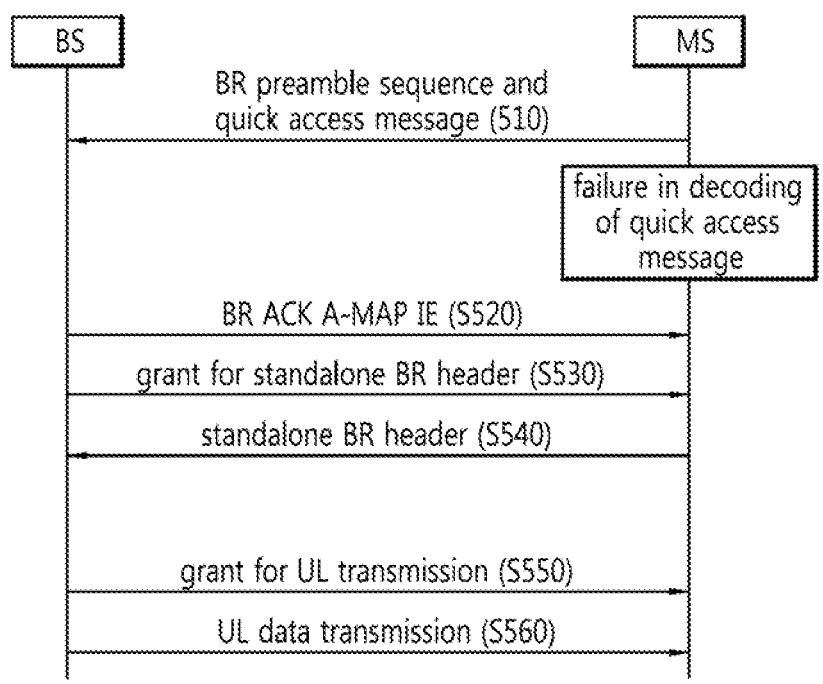
FIG. 5 shows an example of a 5-step random access-based BR procedure as a fall-back mode when a 3-step mode fails.

FIG. 5 shows an example of a 5-step random access-based BR procedure as a fall-back mode when a 3-step mode fails.

An AMS transmits a BR preamble sequence (or BR code), UL BR information (station ID), a request size, a BR index indicating QoS, etc., to a BS by using a quick access message (step S510).

The BS can transmit to AMSs a reception state for the BR preamble sequence and quick access message transmitted by each AMS by using a BR ACK A-MAP IE. It is assumed herein that, although the BR preamble sequence is normally decoded, an error occurs in the quick access message. Therefore, the BR ACK A-MAP IE indicates that the BR preamble sequence is normally received and that the quick access message has an error (step S520).

Upon normally receiving only the BR preamble sequence transmitted by the AMS, the BS allocates a UL resource for transmitting a bandwidth request (BW-REQ) message to the AMS by using a CDMA Allocation A-MAP IE (step S530).

In step S530, the CDMA A-MAP IE can be transmitted to the AMS in a grant format for a standalone BR.

The AMS transmits the BW-REQ message (e.g., a standalone BR header format) to the BS by using an allocated region (step S540).

Upon receiving the BW-REQ message sent by the AMS, the BS allocates a UL resource to the AMS by using a UL basic assignment A-MAP IE or a grant message for UL data transmission (step S550).

The AMS transmits the UL data to the BS by using an allocated UL resource region.

In this case, the AMS can also transmit additional UL bandwidth request information to the BS (step S560).

That is, FIG. 5 shows a 5-step random access mode as a fall-back mode of a 3-step random access mode. A typical 5-step mode differs from the 5-step mode of FIG. 5 only in that the AMS does not send the quick access message in step S510. The remaining steps can be performed by directly using the steps of FIG. 5.

BR Channel Structure

FIG. 6 shows an example of one BR channel structure.

Referring to FIG. 6, one BR channel consists of 3 tiles. In this case, one tile consists of 6 OFDM symbols in a time axis, and 6 contiguous subcarriers in a frequency axis. Therefore, BR preamble sequences Pr0 to Pr23 are repetitively transmitted in each tile, and quick access messages M0 to M 35 are transmitted across the 3 tiles.

Radio Communication Environment Configured with Heterogeneous Networks

Figure 7:
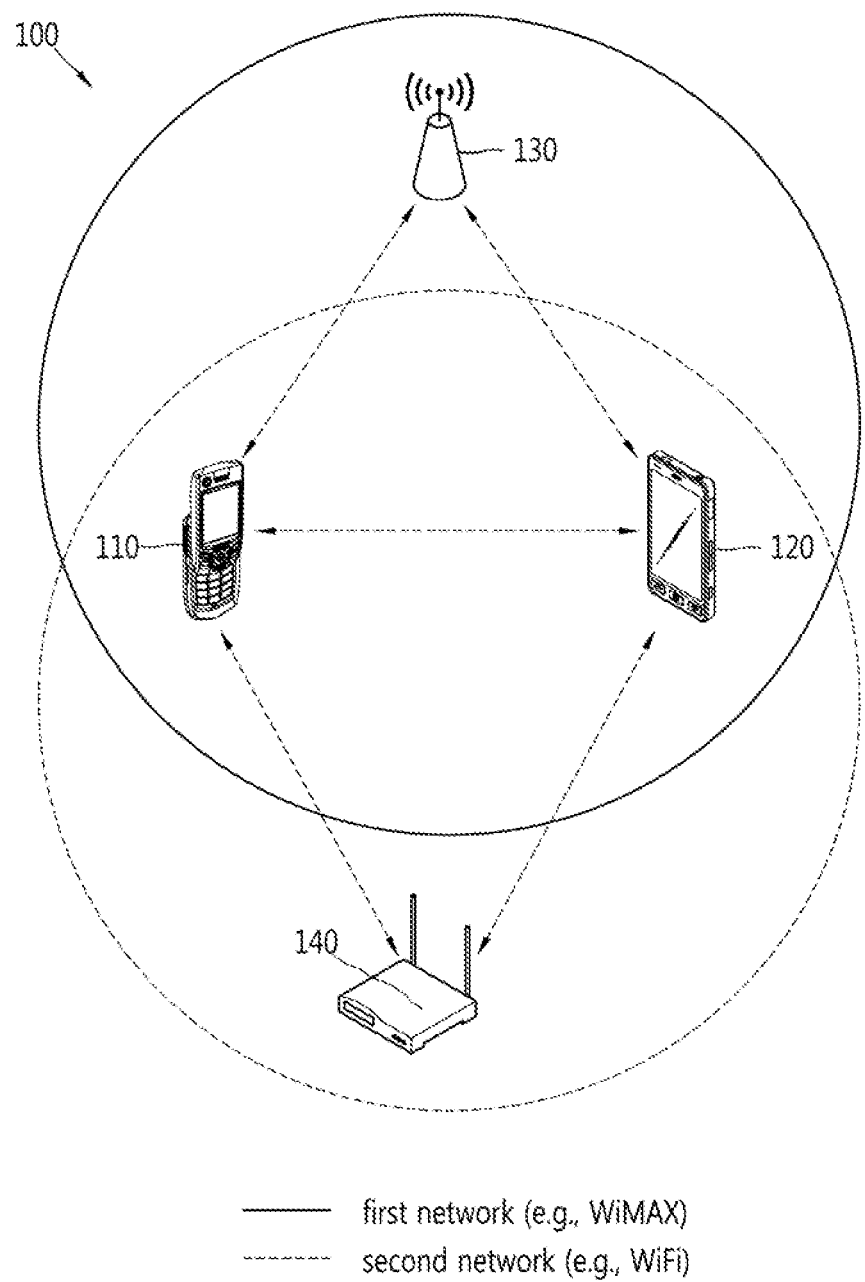
FIG. 7 shows an example of a system for performing cooperative communication between terminals (i.e., client cooperation (CC)) in a radio communication environment having two or more heterogeneous networks (i.e., multi-RAT).

FIG. 7 shows an example of a system for performing cooperative communication between terminals (i.e., client cooperation (CC)) in a radio communication environment having two or more heterogeneous networks (i.e., multi-RAT).

In a mobile communication system, a user equipment (UE) can receive information from a base station (BS) through a downlink, and the UE can transmit information through an uplink. Examples of the information transmitted or received by the UE include data and a variety of control information. Various physical channels exist according to a type and usage of the information transmitted or received by the UE.

Two or more heterogeneous network may exist in a current communication environment. For example, various types of heterogeneous networks may exist such as a WiMAX network which is an example of a mobile communication system and a WiFi network which uses a WiFi network. The heterogeneous network implies a network which uses a communication mechanism different from that used in a specific network from the viewpoint of the specific network, and a heterogeneous terminal implies a terminal belonging to the heterogeneous network which uses the communication mechanism different from the specific network.

For example, from the viewpoint of a WiMAX network and a terminal belongs to the WiMAX network, since the WiFi network uses a communication mechanism different from that of the WiMAX network, the WiFi network corresponds to a heterogeneous network, and the terminal belonging to the WiFi network corresponds to a heterogeneous terminal. From the viewpoint of the WiFi network, the WiMAX network may be a heterogeneous network, and a terminal belonging to the WiMAX network may be a heterogeneous terminal In addition, a 'multi-mode terminal' used in the present invention implies a terminal which supports the use of two or more heterogeneous networks (or multi-RAT). The WiFi implies a local area network (LAN) on which high-speed internet is available within a specific distance in a place where an access point (AP) is installed. The WiFi uses a radio wave or infra-red communication, and is generally called a wireless LAN.

In a wireless environment, the terminal can use a heterogeneous network which exists to support a heterogeneous terminal in addition to an RAT of which a service is received for throughput enhancement or for efficient signal transmission and reception. The RAT is a technology type used in a radio access. For example, the RAT includes GSM/EDGE radio access network (GERAN), UMTS terrestrial radio access network (UTRAN), evolved-UMTS terrestrial radio access network (UTRAN), WiMAX, and WiFi. The GERAN, the UTRAN, the E-UTRAN, the WiMAX and/or the WiFi coexist in the same region.

In this case, without being limited to a specific RAT, a multi-mode terminal supporting a multi-RAT to use two or more heterogeneous networks can transmit and receive a signal by using another RAT capable of providing the best service in a current terminal situation. The number of heterogeneous networks (or a plurality of RATs) to which the multi-mode terminal accesses to transmit and receive a signal may be greater than or equal to 2. Therefore, the multi-mode terminal can transmit and receive the signal from a BS which uses an RAT different from that used in a serving BS or from each of BSs which use a heterogeneous network (or heterogeneous RAT) or through cooperation.

Referring to FIG. 7, a UE in a wireless communication system 100 can transmit and receive a signal by using two or more heterogeneous networks (or multi-RAT).

For example, in FIG. 7, the UE transmits and receives a signal by using a first network (i.e., WiMAX network) and a second network (i.e., WiFi network). A $1^{st}$ UE 110 and a $2^{nd}$ UE 120 in the wireless communication system 100 are multi-mode UE supporting a multi-RAT and capable of using two or more heterogeneous networks. That is, as shown in FIG. 7, the $1^{st}$ UE 110 and the $2^{nd}$ UE 120 support a multi-mode to transmit and receive a signal through heterogeneous networks, i.e., the WiMAX network and the WiFi network. The $1^{st}$ UE 110 and the $2^{nd}$ UE 120 may be the MS 10 of FIG. 2. The RF unit 13 included in the MS 10 of FIG. 2 can be configured to support the multi-RAT.

In this case, a BS 130 of the first network (i.e., WiMAX network) may exist in the wireless communication system 100. In the wireless communication system 100, the $1^{st}$ and $2^{nd}$ UEs 110 and 120 supporting the multi-RAT can transmit and receive a signal with respect to the BS 130 through the first network (i.e., WiMAX). The BS 130 may be the BS 20 of FIG. 2.

In addition, an access point (AP) corresponding to the BS of the second network (i.e., WiFi network) may exist in the wireless communication system 100. The $1^{st}$ and $2^{nd}$ UEs 110 and 120 supporting the multi-RAT in the wireless communication system 100 can transmit and receive signals with each other through the second network (i.e., WiFi). That is, the $1^{st}$ and $2^{nd}$ UEs 110 and 120 in the wireless communication system 100 can perform communication via the AP 140 according to a configuration of an infrastructure mode, or can perform direct communication with each other according to a configuration of an Ad-hoc mode. It is assumed hereinafter that the $1^{st}$ and $2^{nd}$ UEs 110 and 120 can transmit and receive signals with each other through the second network (i.e., WiFi) even if the AP 140 is not mentioned specifically.

It is assumed in the present invention that the CC performed between the $1^{st}$ and $2^{nd}$ UEs 110 and 120 is for the second network (i.e., WiFi network) corresponding to a direct link between the UEs, which is different from the first network (i.e., WiMAX network) corresponding to a cellular network. As such, although the WiFi network is used as the direct link between the UEs for example, the present invention is not limited thereto.

Meanwhile, the $1^{st}$ and $2^{nd}$ UEs 110 and 120 are grouped or paired to transmit and receive signals through the CC. The grouping or pairing between the $1^{st}$ and $2^{nd}$ UEs 110 and 120 can be achieved by using a method in which any one of the UEs determines a peer UE for performing the CC and requests to the BS 130 or a method in which the BS 130 indicates information of the UEs for performing the CC. It is assumed hereinafter that the method of performing the CC is performed by the grouped or paired UEs, that is, the UEs determined to perform the CC.

CC Execution Mode

Figure 8:
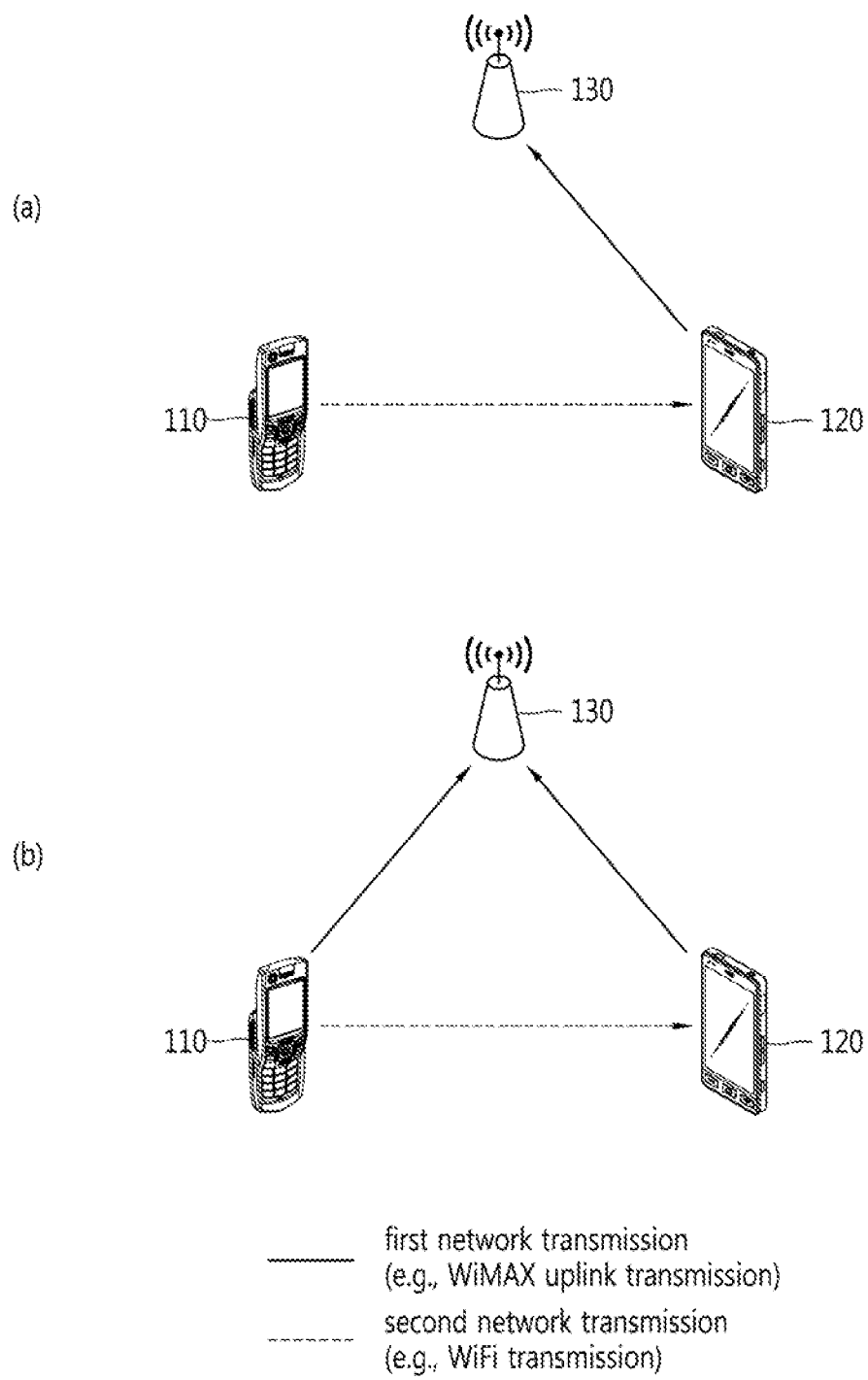
FIG. 8A shows a case in which an MS supporting a multi-RAT performs CC according to a relaying mode.
FIG. 8B shows a case in which an MS supporting a multi-RAT performs CC according to a cooperative transmission mode.

Modes in which a terminal supporting a multi-RAT performs CC are described with reference to FIG. 8.

In the present invention, terminals which are entities for performing the CC are called a source mobile station (S-MS) and a target mobile station (T-MS). However, the present invention is not limited thereto. The S-MS is a terminal which is an entity of data transmission and reception with a BS and/or a relay station. The T-MS is a terminal which helps data transmission and reception with the S-MS and the BS and/or the relay station.

In FIGS. 8A and 8B, a 1st MS 100 and a 2nd MS 120 perform the CC with each other. The 1st MS 110 operates as an S-MS which intends to transmit data to a BS 130. The 2nd MS 120 operates as a T-MS which helps data transmission and reception of the 1st MS 110 through the CC. The 1st MS 110 and the 2nd MS 120 may be the MS 10 of FIG. 2, and the BS 130 may be the BS 20 of FIG. 2.

CC of an MS supporting a multi-RAT can be applied when a propagation loss is great in an RAT between an S-MS and a BS or when a channel state is not good, and in addition thereto, can also be applied, irrespective of the channel state, when it is necessary due to a device state (e.g., battery shortage) of the S-MS, or when a user of an extra S-MS requests quick/urgent transmission.

As such, the MS supporting the multi-RAT can operate according to a relaying mode or a cooperative transmission mode to transmit and receive data through the CC.

FIG. 8A shows a case in which an MS supporting a multi-RAT performs CC according to a relaying mode. In the relaying mode, an S-MS which intends to transmit data to a BS transmits the data to a T-MS, and the T-MS transmits to the BS the data received from the S-MS.

More specifically, referring to FIG. 8A, the S-MS 110 supporting a multi-RAT transmits data to the T-MS 120 through an RAT corresponding to a direct link, that is, through a second network, and the T-MS 120 delivers to the BS 130 the received data through the 1st network which is an RAT different from the RAT corresponding to the direct link. As such, a UL resource must be assigned to the T-MS 120 to transmit the data. In this case, the UL resource can be allocated from the BS 130 at the request of the S-MS 110 or the T-MS 120.

FIG. 8B shows a case in which an MS supporting a multi-RAT performs CC according to a cooperative transmission mode. In the cooperative transmission mode, an S-MS which intends to transmit data to a BS transmits the data to a T-MS, and the S-MS and the T-MS transmit the data to the BS through cooperation.

More specifically, referring to FIG. 8B, the S-MS 110 supporting a multi-RAT transmits data to the T-MS 120 through an RAT corresponding to a direct link, that is, through a second network, and the S-MS 110 and the T-MS 120 deliver to the BS 130 the received data by performing cooperative transmission through the 1st network which is an RAT different from the RAT corresponding to the direct link.

Hereinafter, a procedure of allocating UL resources so that an S-MS supporting a multi-RAT can transmit data to a BS through CC with a T-MS is described according to embodiments of the present invention. The embodiments described below can be identified according to an execution mode (e.g., a relaying mode or a cooperative transmission mode) of the CC performed by the S-MS and the T-MS or can be identified according to an entity (e.g., S-MS or T-MS) for requesting allocation of UL resources.

Allocation of UL Resources at the Request of S-Ms

Embodiments of the present invention in which UL resources are allocated when performing CC in a relaying mode as shown in FIG. 8A will be described with reference to FIG. 9 to FIG. 13.

First, embodiments described with reference to FIG. 9 to FIG. 12 relate to a method of allocating UL resources at the request of the S-MS. Meanwhile, as described later, the embodiments in which resources are allocated at the request of the S-MS may differ according to whether a time of the request is before, after, or during data transmission in comparison with a time of transmitting data through a second network.

First Embodiment

Figure 9:
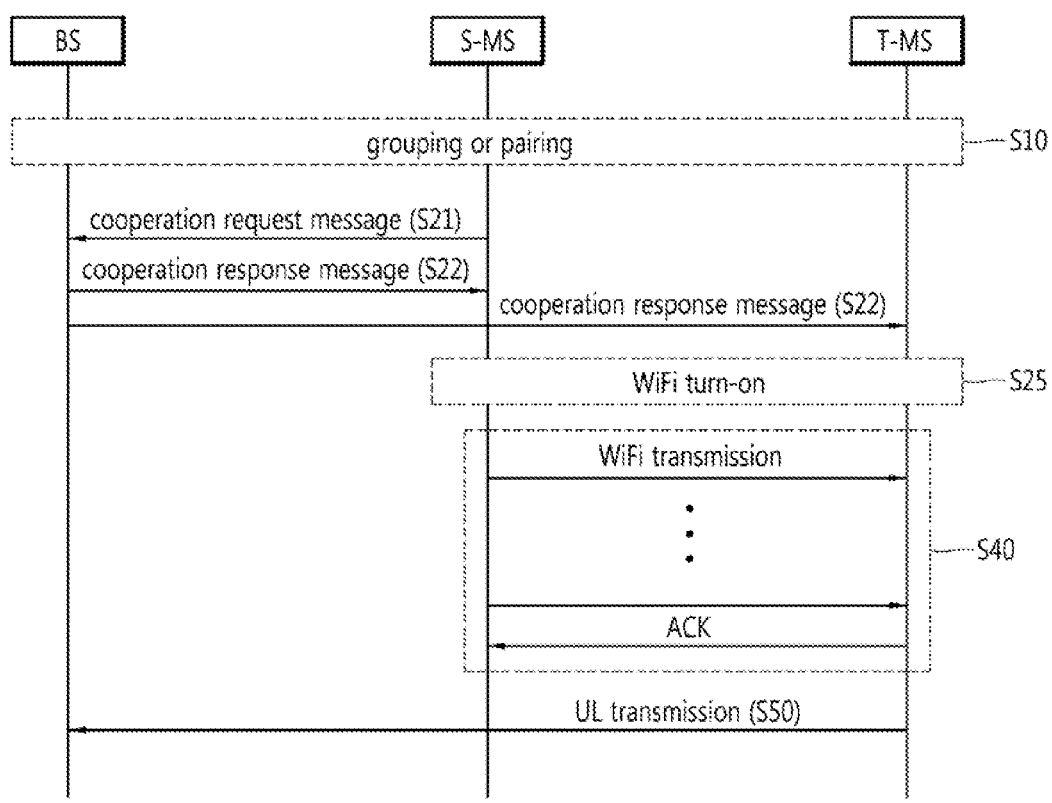
FIG. 9 is a flowchart of a UL resource allocation method according to a first embodiment of the present invention.

FIG. 9 is a flowchart of a UL resource allocation method according to a first embodiment of the present invention. In the UL resource allocation information of the first embodiment, a resource allocation request of an S-MS for communication through a first network is achieved before data transmission through a second network.

Referring to FIG. 9, it is assumed that an S-MS and a T-MS communicate with a BS through a first network (e.g., WiMAX), and CC is performed through a second network (e.g., WiFi) corresponding to a direct link.

First, the S-MS performs grouping or pairing for the CC by the indication of the BS or at the request of the S-MS (step S10).

Next, the S-MS transmits a cooperation request message to the BS (S21). The cooperation request message may be CC-Req_message. The cooperation request message may be for a CC request.

In addition, the cooperation request message may include information which requests UL resource allocation for UL transmission of the T-MS. The information on the resource allocation request for UL transmission is for requesting a UL resource when the T-MS intends to transmit to the BS a signal received from the S-MS.

In addition, the cooperation request message may include a length of data to be transmitted by the S-MS to the T-MS or a time of transmitting a signal through the second network between the two MSs (i.e., S-MS and T-MS). In case of WiFi, the signal transmission time may be an estimated time, a time offset, or a UL grant time.

In addition, the cooperation request message may include information on the grouping or pairing for the CC. Herein, the information on grouping or pairing may be a common ID (e.g., group ID or pairing ID).

Next, upon receiving the cooperation request message, the BS transmits a cooperation response message to the S-MS and the T-MS (step S22). The cooperation response message may be CC-Rsp_message. The S-MS and the T-MS which receive the cooperation response message can be designated on the basis of the information on grouping or pairing included in the cooperation request message. The cooperation response message can be transmitted by using a broadcast signal or a multicast signal.

The cooperation response message may include an indicator for confirming whether to perform the CC. The indicator for confirming whether to perform the CC may be CC-confirm_message (or CC-confirm_indicator). The CC-confirm_message can be expressed in one bit. The CC-confirm_message can indicate that a corresponding communication module must be activated for direct transmission through the second network between the S-MS and the T-MS. For example, if the second network is WiFi and the WiFi module is not activated, the S-MS and/or the T-MS can activate each WiFi module on the basis of the CC-confirm_message.

In addition, the cooperation response message may include UL resource allocation information or a UL grant. The UL grant indicates information on a resource to be used when the T-MS performs UL transmission.

In addition, the cooperative response message may include an indicator for a CC-mode. For example, the cooperative response message can indicate a relaying mode or a cooperative transmission mode.

In addition, the cooperative response message may include channel information (for WiFi transmission), a common ID (e.g., a grouping ID or a pairing ID) for two MSs, a station ID (STID) (of the S-MS and the T-MS), UL transmission information (e.g., power, MCS, PMI, etc.), a time offset or estimated time for transmission, a WiFi transmission start time or point, and a UL grant time or time offset.

Next, if a communication module for the second network is inactivated, upon receiving the cooperative response message, the S-MS or the T-MS can activate the communication module (step S25).

Next, the S-MS can transmit to the T-MS a signal for data transmission (step S40). That is, the S-MS can transmit data to the T-MS through the second network.

Next, upon receiving the data from the S-MS, the T-MS transmits a signal in a UL region by using the UL grant included in the received cooperation response message (step S50). Unlike this, the BS can transmit the cooperation response message to the S-MS which performs the request, and the S-MS which receives information on the UL grant included in the cooperation response message can transmit it to the T-MS through the second network. Upon receiving the UL resource allocation information transmitted by the S-MS, the T-MS performs UL transmission to the BS by using the resource.

Meanwhile, the aforementioned first embodiment can be modified such that the UL resource is allocated by considering a signal transmission time using the second network. More specifically, if the S-MS transmits information on the signal transmission time using the second network between the two MSs (i.e., S-MS and T-MS) to the BS by inserting the information into the cooperation request message, the BS can allocate the UL resource on the basis of the information on the transmission time. In this case, it is possible to decrease an overload of the BS which unnecessarily needs to reserve a resource for UL transmission.

Embodiments Modified from First Embodiment

Meanwhile, the aforementioned first embodiment can be modified such that, unlike a method in which the BS directly transmits the UL grant to the T-MS by using the cooperation response message, the BS transmits the UL grant to the T-MS after a specific time elapses.

More specifically, the modified embodiments can be configured such that the cooperation response message may include information on transmission of the UL grant, that is, a transmission time (or grant time offset) of the UL grant and information on a transmission resource and region. In these embodiments, the T-MS can receive the UL resource allocation information on the basis of the received information on transmission of the UL grant.

Further, more specifically, the modified embodiments can be configured such that the cooperation response message includes information on a time at which the UL grant is transmitted. In these embodiments, the information on the time at which the UL grant is transmitted may have a format of a relative offset from a subframe in which the cooperation response message is transmitted, or a format of an absolute timing value (e.g., radio frame index+subframe index). In this case, the T-MS can receive the UL grant through a DL control channel (e.g., assignment AMAP-IE) at a time at which the UL grant is transmitted.

Further, more specifically, the modified embodiments can be configured such that, when the cooperation request message transmitted from the S-MS includes prediction information capable of calculating the time at which the UL grant is transmitted, the BS can transmit the UL grant at the time calculated on the basis of the prediction information. In these embodiments, the prediction information included in the cooperation request message may be a length of data to be transmitted to the T-MS or a signal transmission time using the second network. In this case, the T-MS can receive the UL grant from the BS at the time calculated on the basis of the prediction information.

Meanwhile, in the aforementioned first embodiment and its modified embodiments, the T-MS can receive UL resource allocation information without having to perform an additional bandwidth request (BR) procedure to transmit data received from the S-MS through the second network.

In addition, for CC, the T-MS can allocate a flow ID (FID) to distinguish data generated autonomously from the data received from the S-MS. The FID can be designated by the S-MS or the BS by using the cooperation request message or the cooperation response message.

Meanwhile, the aforementioned embodiments can be modified such that the S-MS receives the UL grant included in the cooperation response message in response to the cooperation request message, the S-MS transmits to the T-MS the UL resource allocation information depending on the received UL grant, and the T-MS transmits data to the BS by using the allocated resource.

Meanwhile, the aforementioned embodiments can be modified such that the cooperation response message to be transmitted to the S-MS does not include the UL grant, and the BS transmits the UL grant to the T-MS confirmed on the basis of grouping or pairing information for the CC with the S-MS. In this case, the T-MS can perform UL transmission of the data according to the received UL grant.

Meanwhile, in the aforementioned embodiments, the S-MS and the T-MS can recognize data transmission start times with each other by using information regarding a time at which transmission through the second network starts (e.g., WiFi transmission start time or start point) and included in the cooperation response message received from the BS.

Second Embodiment

Figure 10:
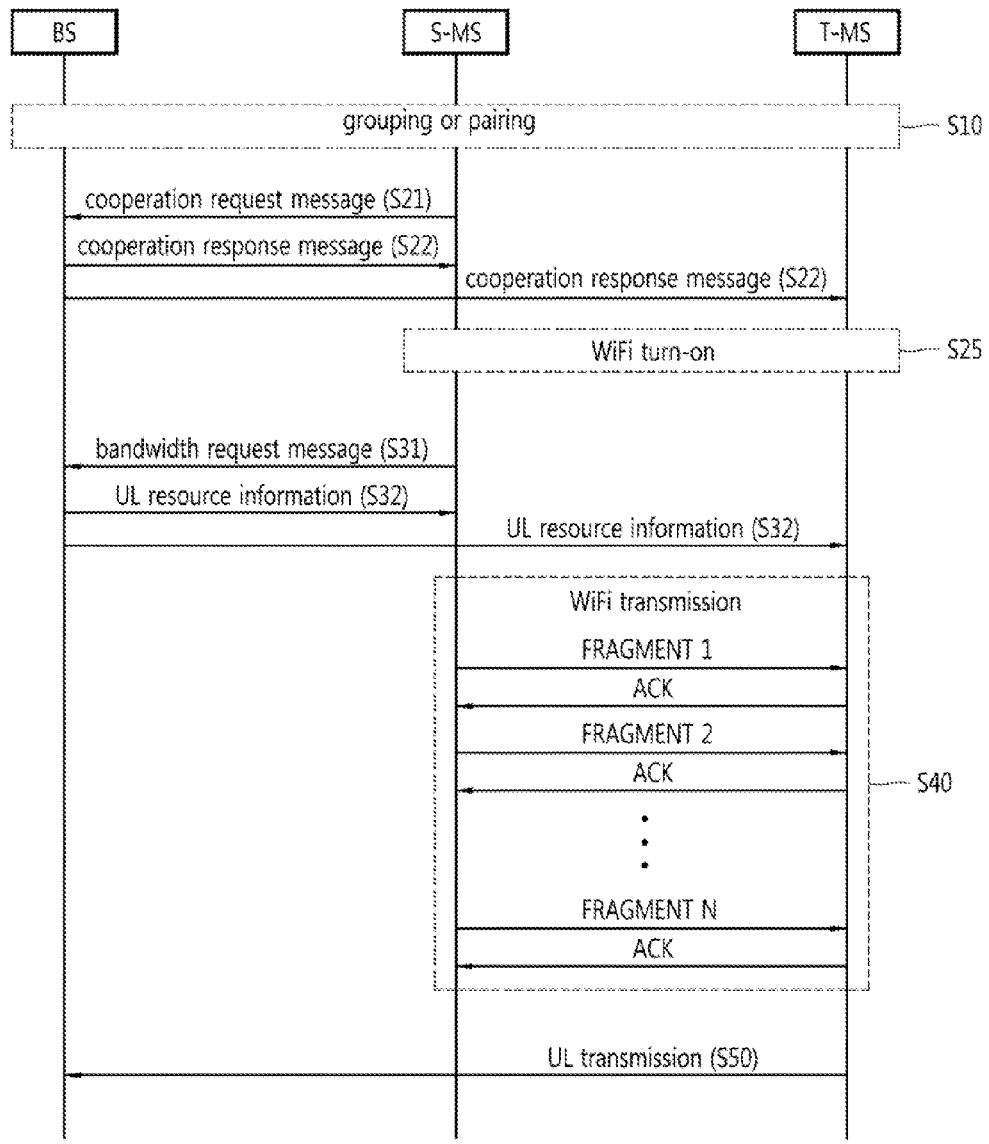
FIG. 10 is a flowchart of a UL resource allocation method according to a second embodiment of the present invention.

FIG. 10 is a flowchart of a UL resource allocation method according to a second embodiment of the present invention. The UL resource allocation method according to the second embodiment is another embodiment of a UL resource allocation method performed at the request of the S-MS. Unlike in the aforementioned first embodiment, the S-MS transmits a BR message to the BS in addition to the cooperation request message for CC. The BR message may be CC-BR.

Referring to FIG. 10, the S-MS additionally transmits a BR message to a BS (step S31). The BS transmits UL resource information or a UL grant in response to the BR message (step S32).

In this case, a UL resource allocation request and resource allocation information thereon are not included in the cooperation request message (step S21) and the cooperation response message (step S22), respectively, performed before the BR message transmission procedure (step S31). That is, similarly to the case of the aforementioned first embodiment, the cooperation response message may include an indicator for confirming whether to perform the CC. The indicator for confirming whether to perform the CC may be CC-confirm_message (or CC-confirm_indicator). The CC-confirm_message can be expressed in one bit. The CC-confirm_message can indicate that a corresponding communication module must be activated for direct transmission through the second network between the S-MS and the T-MS.

However, the UL resource allocation method according to the second embodiment differs from the aforementioned first embodiment in that the cooperation response message includes information on a resource allocated by the BS so that the S-MS can transmit the BR message. Therefore, the S-MS transmits the BR message to the BS on the basis of the information on the resource allocated for transmission of the BR message included in the cooperation response message. In this case, the resource for transmission of the BR message can be allocated such that the BR message can be transmitted (step S31) at any time until the UL transmission is performed (step S50) after the S-MS receives the cooperation response message (step S22).

In addition, the BS can transmit the UL grant to the S-MS or the T-MS in response to the BR message. The UL grant can be transmitted by using a common message or by using an MS-specific message.

In the above case, a response message for the request of the S-MS can be transmitted to both of the two MSs by using a multi-casting signal or can be transmitted to only the S-MS or the T-MS. When the response message is transmitted only to the S-MS, the S-MS can transmit a UL grant or allocated UL resource information, which is received through the response, to the T-MS by using a second network. By transmission and receiving the UL resource information, the T-MS can transmit a signal and data received for performing the CC by the use of the UL resource.

Third Embodiment

Figure 11:
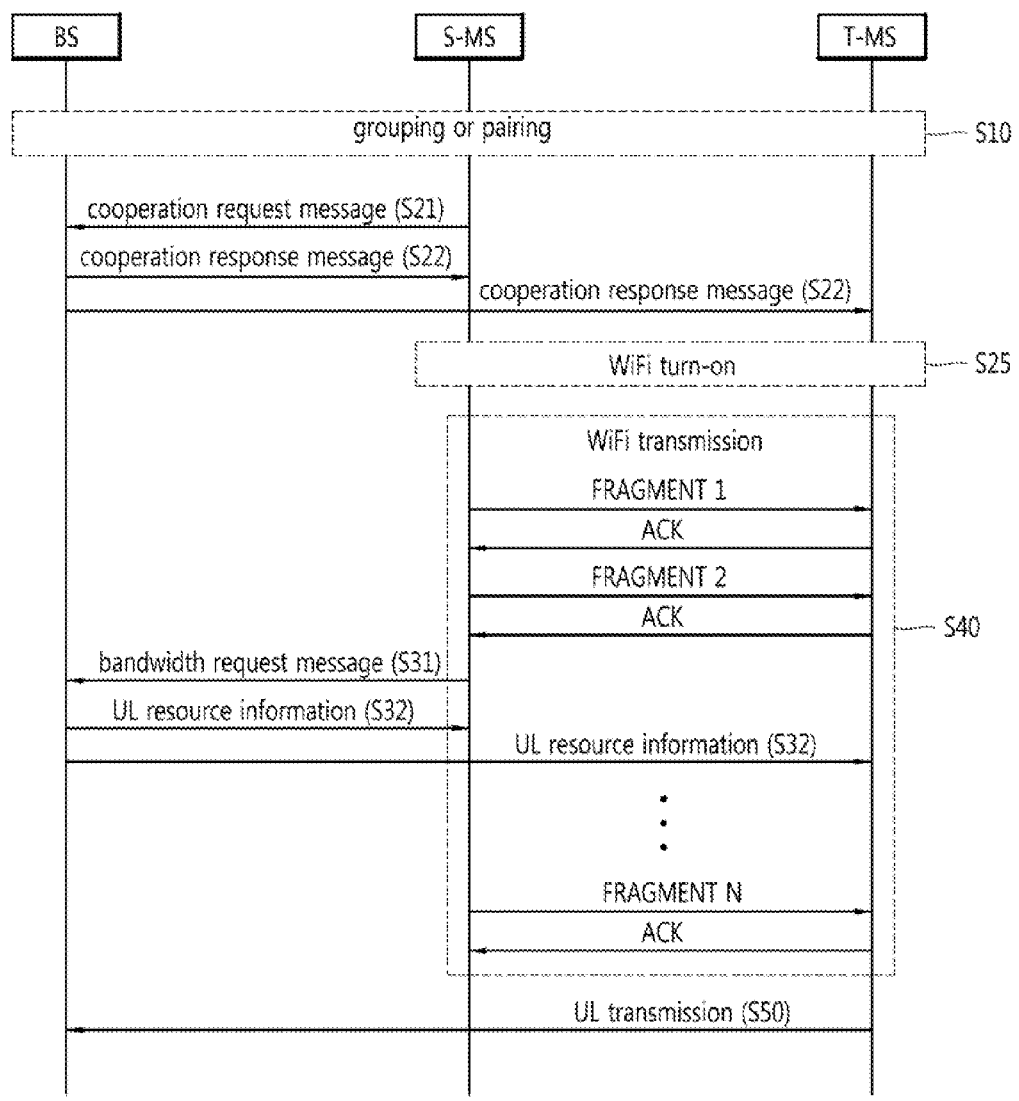
FIG. 11 is a flowchart of a UL resource allocation method according to a third embodiment of the present invention.

FIG. 11 is a flowchart of a UL resource allocation method according to a third embodiment of the present invention. In the UL resource allocation method according to the third embodiment, a resource allocation request of an S-MS for communication on a first network is achieved while data is transmitted through a second network.

Upon receiving a cooperation response message from a BS, the S-MS fragments data and transmits the several fragmented pieces of data to the T-MS (step S40).

Comparing with the aforementioned second embodiment, the third embodiment differs in that, after the S-MS transmits first fragmented data, that is, after the S-MS receives ACK for transmission of the first fragmented data, the S-MS transmits a BR message to the BS (step S31). Regarding the remaining steps, similarly to the second embodiment, the T-MS receives a UL grant in response to the BR message, and performs UL transmission by using a resource allocated depending on the received UL grant (step S50).

Although the BR message is transmitted after the S-MS transmits the first fragmented data to the T-MS through the second network in the aforementioned third embodiment, this is for exemplary purposes only, and thus the BR message can also be transmitted at another time.

Fourth Embodiment

Figure 12:
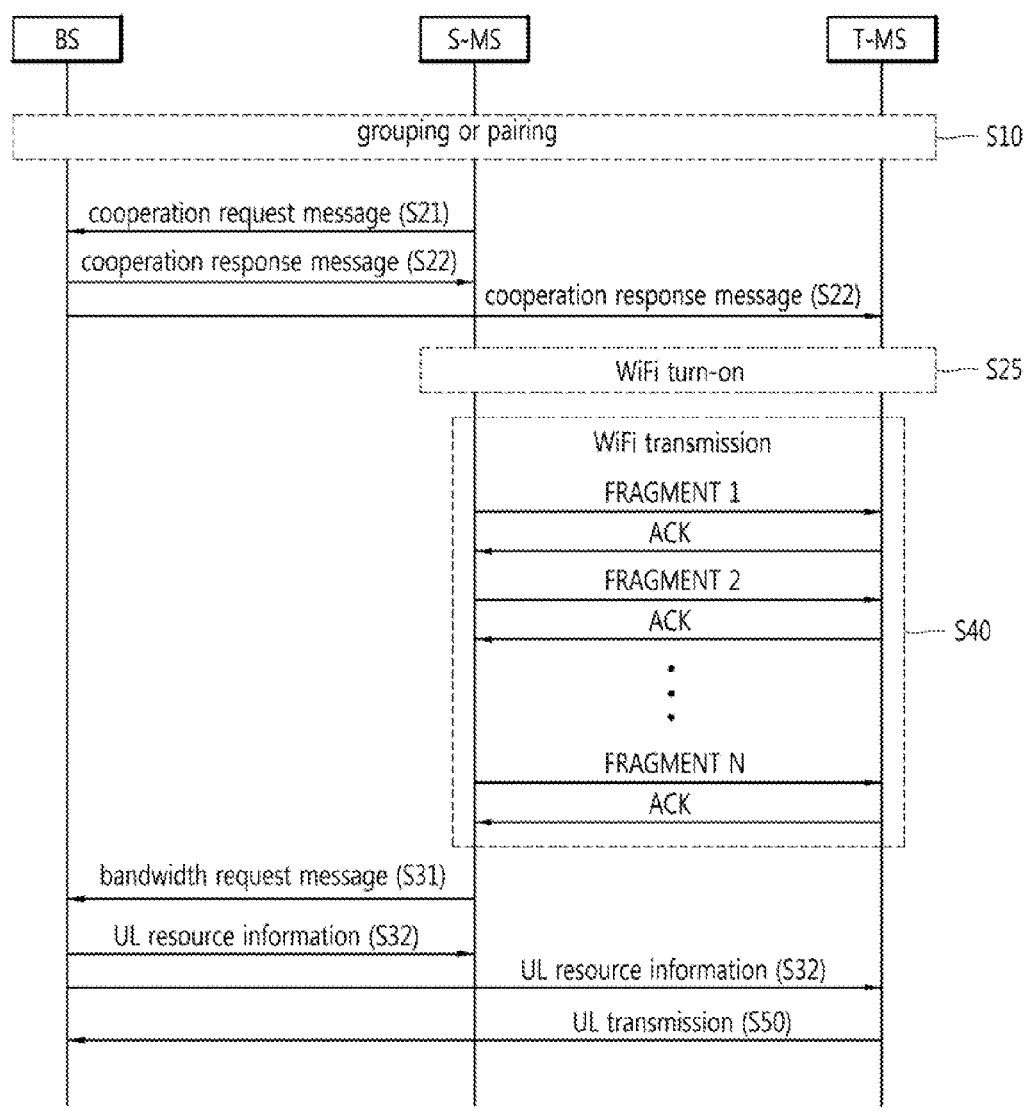
FIG. 12 is a flowchart of a UL resource allocation method according to a fourth embodiment of the present invention.

FIG. 12 is a flowchart of a UL resource allocation method according to a fourth embodiment of the present invention. In the UL resource allocation method according to the fourth embodiment, a resource allocation request of an S-MS for communication on a first network is achieved after the data is transmitted through a second network.

Comparing with the aforementioned second and third embodiments, the fourth embodiment differs in that the S-MS transmits data to the T-MS through the second network, and transmits the BR message to the BS (step S31) after receiving an ACK message from the T-MS (step S40) or when receiving the ACK message. Regarding the remaining steps, similarly to the second and third embodiments, the T-MS receives a UL grant in response to the BR message, and performs UL transmission by using a resource allocated depending on the received UL grant (step S50).

UL Resource Allocation at the Request of T-MS

Hereinafter, embodiments of allocating UL resources at the request of the T-MS and modified embodiments thereof will be described with reference to FIG. 13. As will be described below, the embodiments in which resources for UL transmission are allocated at the request of the T-MS may differ according to whether a time of the request is before, after, or during data transmission in comparison with a time of transmitting data through a second network.

Fifth Embodiment

Figure 13:
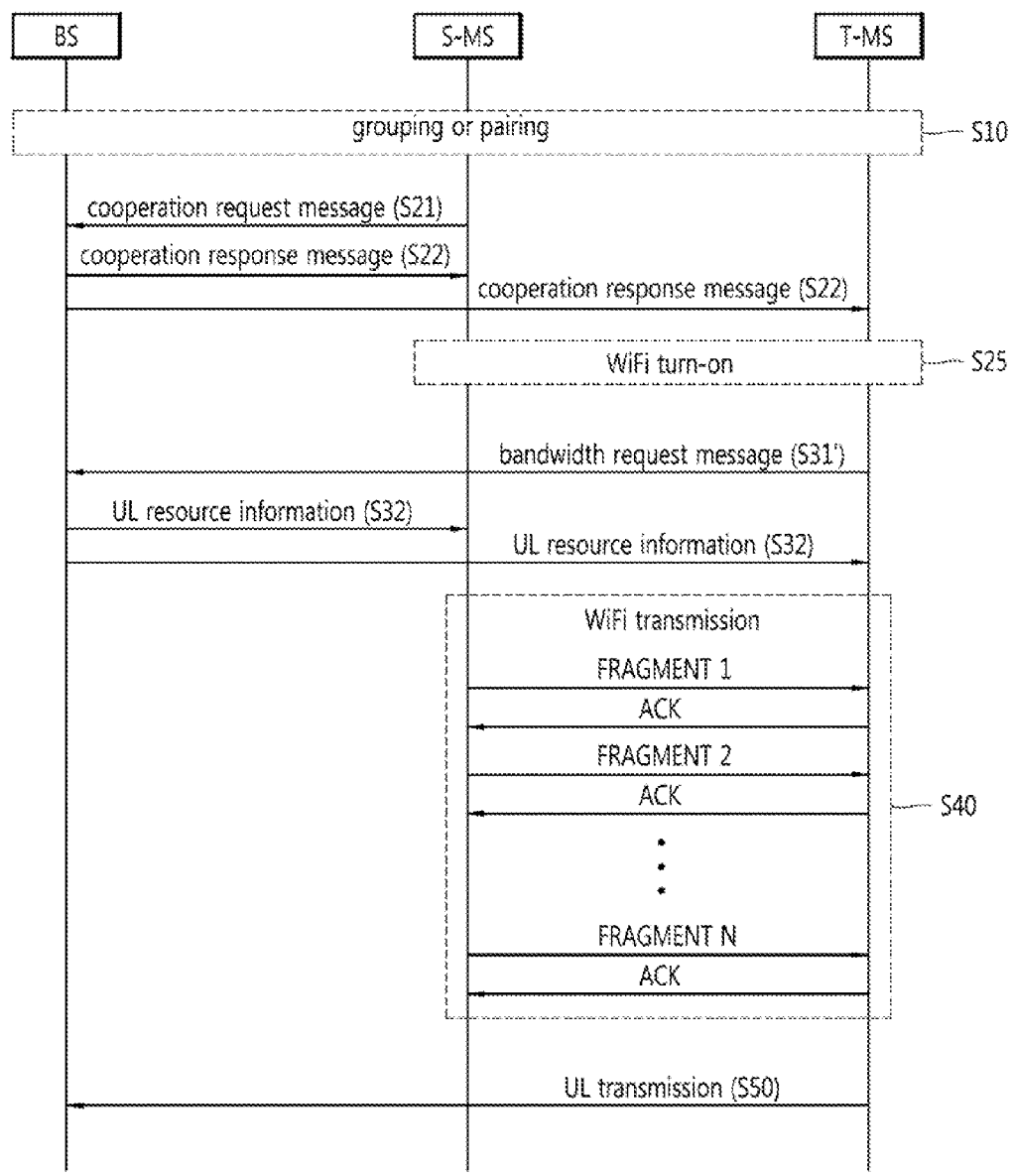
FIG. 13 is a flowchart of a UL resource allocation method according to a fifth embodiment of the present invention.

FIG. 13 is a flowchart of a UL resource allocation method according to a fifth embodiment of the present invention. In the UL resource allocation method according to the fifth embodiment, similarly to the aforementioned first and second embodiments, a resource allocation request of a T-MS for communication on a first network is achieved before data transmission through a second network.

Referring to FIG. 13, the resource allocation method according to the fifth embodiment differs from the second embodiment in that a UL resource is allocated at the request of the T-MS. That is, in the resource allocation method according to the fifth embodiment, independently from a step in which the S-MS transmits to the BS a cooperation request message for CC, the T-MS transmits a BR message to the BS (step S31'). The BR message may be CC-BR. In addition, the BS transmits UL resource information or a UL grant in response to the BR message of the T-MS (step S32).

In this case, similarly to the second embodiment, a UL resource allocation request and resource allocation information thereon are not included in the cooperation request message transmission of the S-MS (step S21) and the cooperation reception message reception (step S22), respectively, performed before the BR message transmission procedure of the T-MS (step S31). That is, similarly to the case of the aforementioned second embodiment, the cooperation response message may include an indicator for confirming whether to perform CC. The indicator for confirming whether to perform CC may be CC-confirm_message (or CC-confirm_indicator). The CC-confirm_message can be expressed in one bit. The CC-confirm_message can indicate that a corresponding communication module must be activated for direct transmission through the second network between the S-MS and the T-MS.

In addition, the UL resource allocation method according to the fifth embodiment is similar to the case of the second embodiment in that the cooperation response message includes information on a resource allocated by the BS so that the T-MS can transmit the BR message. Therefore, the T-MS transmits the BR message to the BS on the basis of the information on the resource allocated for transmission of the BR message included in the cooperation response message. In this case, the resource for transmission of the BR message can be allocated such that the BR message can be transmitted (step S31) at any time until the UL transmission is performed (step S50) after the T-MS receives the cooperation response message (step S22).

Embodiments Modified from Fifth Embodiment

Meanwhile, the fifth embodiment can be modified according to a specific time of performing a procedure in which the T-RS transmits a BR message to request a resource allocation. This is similar to the above explanation described with reference to FIG. 11 and FIG. 12.

More specifically, although not shown, the fifth embodiment can be modified such that a resource allocation request of the T-MS for communication through a first network is achieved during data is transmitted through a second network. In this case, upon receiving a cooperation response message from a BS, the S-MS fragments data and transmits the several fragmented pieces of data to the T-MS (step S40). The T-MS which receives first fragmented data transmitted by the S-MS can transmit a BR message to the BS after transmitting ACK for transmission of the first fragmented data or at the same time of transmitting the ACK. The remaining steps are similar to those of the fifth embodiment.

More specifically, although not shown, the fifth embodiment can be modified such that a resource allocation request of the T-MS for communication through a first network is achieved after data is transmitted through a second network. In this case, upon receiving data from the S-MS through the second network, after transmitting a last ACK message in response to the received data or when transmitting the ACK message, the T-MS transmits the BR message to the BS (step S31'). In the remaining steps, similarly to those of the fifth embodiment, the T-MS receives a UL grant in response to the BR message, and performs UL transmission by using a resource allocated according to the received UL grant (step S50).

Sixth Embodiment

Hereinafter, embodiments of allocating UL resources will be described with reference to FIG. 14 for a case where CC is performed in a cooperative transmission mode as shown in FIG. 8B.

Figure 14:
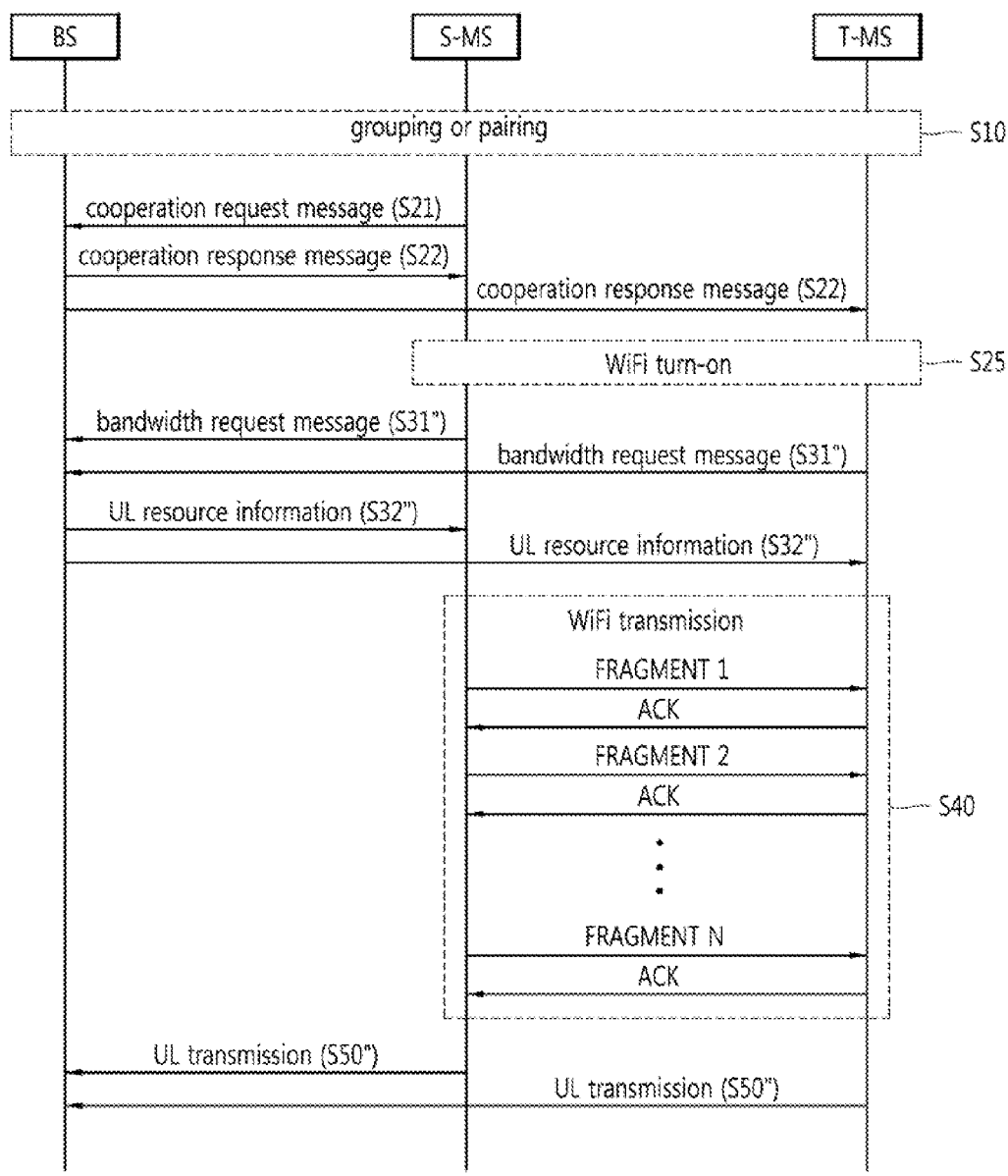
FIG. 14 is a flowchart showing a UL resource allocation method according to a sixth embodiment of the present invention.

FIG. 14 is a flowchart showing a UL resource allocation method according to a sixth embodiment of the present invention. In the UL resource allocation method according to the sixth embodiment of the present invention, a UL resource is allocated at the request of the S-MS or the T-MS, and data is transmitted to the BS in a cooperative communication mode.

Referring to FIG. 14, the S-MS performs grouping or pairing for CC by the indication of the BS or at the request of the S-MS (step S10).

Next, the S-MS transmits a cooperation request message to the BS (S21). The BS transmits a cooperation response message to the S-MS and/or the T-MS in response to the cooperation request message (step S22). The cooperation request message (step S21) and the cooperation response message (step S22) can be configured as shown in FIG. 9 or in FIG. 10 to FIG. 13. That is, a UL resource allocation request and resource allocation information thereon may be included in the cooperation request message and the cooperation response message, respectively. However, if not included, CC-confirm_message (or CC-confirm_indicator) may be included in the cooperation response message. The S-MS and the T-MS can activate a communication module for direction transmission through the second network on the basis of the CC-confirm_message.

In addition, the UL resource allocation method according to the sixth embodiment differs from the first embodiment in that the cooperation response message includes information on a resource allocated by the BS so that the S-MS or the T-MS can transmit the BR message.

Next, the S-MS or the T-MS transmits the BR message to the BS on the basis of the information on the resource allocated for transmission of the BR message included in the cooperation response message (step S31"). In this case, the resource for transmission of the BR message can be allocated such that the BR message can be transmitted (step S31") at any time until the UL transmission is performed (step S50") after the S-MS or the T-MS receives the cooperation response message (step S22).

Next, the S-MS or the T-MS receives a UL grant or UL resource information transmitted from the BS in response to the BR message (step S32").

Next, the S-MS can transmit to the T-MS a signal for data transmission (step S40). That is, the S-MS can transmit data to the T-MS through the second network.

Next, the S-MS or the T-MS transmits a signal to the BS by performing cooperative transmission by the use of each resource allocated according to the UL grant (step S50").

Modified Embodiments and Additional Embodiments

The aforementioned UL resource allocation methods according to the embodiments of the present invention are applied to the S-MS and T-MS supporting the multi-RAT. The MSs are multi-mode MSs supporting both the first network for performing communication with the BS and the second network for performing direct communication between the MSs. Therefore, the T-MS receives data from the S-MS through the second network, and thereafter transmits a signal to the BS through the first network, thereby performing client relaying or cooperative transmission.

Therefore, if a size of data transmission unit is different between the first network and the second network, the T-MS which receives data through the second network can perform retransmission by using a timing control on the first network. For example, if the first network is a WiMAX network and the second network is a WiFi network, a burst size for data transmission in the WiFi network is different from a transmission unit in the WiMAX network. Therefore, in the above case, the T-MS can perform HARQ by using HARQ timing for a long TTI defined in a green-field for data transmission and reception through CC. Therefore, the MSs which perform the CC by using a multi-RAT can perform retransmission by receiving ACK/NACK for a signal transmitted and received by the use of the long TTI HARQ timing.

Meanwhile, although the S-MS is configured to transmit the cooperation request message in order to request the CC in the aforementioned embodiments, instead of transmitting the cooperation request message, the embodiments can be modified such that a BR procedure is performed. That is, the aforementioned embodiments can be modified such that the S-MS requests client cooperative transmission through the BR procedure performed for UL resource allocation so that the S-MS can transmit data to the BS.

In this case, a request of the client cooperative transmission through the BR procedure can use a specific value of a quick access message to indicate the request of the client cooperative transmission. For example, the quick access message transmitted through the aforementioned contention-based BR procedure is configured with a 12-bit STID and a 4-bit predefined BR index. Herein, for example, a specific value of any one of information defined by the predefined BR index can be allocated for a CC request or can be allocated as a value for indicating a CC mode (i.e., relaying or cooperative transmission).

For another example, unlike the above case, it can be configured such that a BR header includes information indicating the request of the client cooperative transmission.

As such, if the aforementioned embodiments are modified such that the client cooperative transmission is requested through the BR procedure, the BS does not have to transmit to the MS a UL grant for transmitting an additional cooperative transmission request message, and thus immediately transmits a cooperation response message to the S-MS.

The scope of the present invention is not limited to the aforementioned embodiments of the present invention. Thus, the present invention can be modified, changed, or improved in various forms without departing from the scope of claims and the technical features of the present invention.

What is claimed is:

1. A method of performing communication in a wireless communication system supporting a multi-radio access technology (RAT) through cooperation between a first terminal requesting client cooperation (CC) and a second terminal accepting the CC, the method comprising:
   transmitting, by the first terminal, resource allocation request information regarding uplink (UL) transmission of the second terminal to a base station,
   wherein the resource allocation request information is included in a cooperation request message;
   receiving, by the second terminal, a first UL grant in response to the resource allocation request information from the base station,
   wherein the first UL grant is received by being included in a cooperation response message transmitted from the base station in response to the cooperation request message,
   wherein the cooperation response message further includes information on the CC between terminals including the first terminal and the second terminal,
   wherein the information on the CC includes an execution mode, and
   wherein the execution mode includes one of a first mode in which data is transmitted through relaying between the terminals or a second mode in which at least two or more terminals simultaneously transmit data;
   transmitting, by the first terminal, data to the second terminal; and
   transmitting, by the second terminal, to the base station the data received from the first terminal by using a resource allocated by the first UL grant.

2. The method of claim 1, wherein the first terminal and the second terminal communicate with the base station by using a first RAT, and
   wherein the first terminal and the second terminal communicate with each other by using a second RAT.

3. The method of claim 1, wherein the resource allocation request information is transmitted to the base station before the data transmission.

4. The method of claim 1, wherein the first terminal transmits the data to the second terminal by fragmenting the data, and
   wherein the resource allocation request information is transmitted to the base station during the fragmented data is transmitted to the second terminal.

5. The method of claim 1, wherein the resource allocation request information is transmitted to the base station after the data transmission.

6. The method of claim 1, further comprising receiving a second UL grant from the base station before the first terminal transmits the resource allocation request information,
   wherein the resource allocation request information is transmitted by using a resource allocated by the second UL grant.

7. The method of claim 1, further comprising, if the execution mode indicates the second mode, transmitting, by the first terminal, the data to the base station.

8. The method of claim 1, wherein the cooperation request message includes an indicator for confirming whether to perform the CC, and
   if the indicator indicates that the first terminal performs the CC, further comprising activating the second RAT.

9. A first terminal for performing communication in a wireless communication system supporting a multi-radio access technology (RAT) through cooperation between the first terminal requesting client cooperation (CC) and a second terminal accepting the CC, the first terminal comprising:
   a first transceiver for communicating with a base station by using a first RAT;
   a second transceiver for communicating with the second terminal by using a second RAT; and
   a processor configured for transmitting resource allocation request information for uplink (UL) transmission of the second terminal to the base station, for receiving a UL grant from the base station in response to the resource allocation request information, for transmitting data to the second terminal, and for transmitting the UL grant to the second terminal so that the second terminal transmits the data to the base station,
   wherein the resource allocation request information is included in a cooperation request message,
   wherein the UL grant is received by being included in a cooperation response message transmitted from the base station in response to the cooperation request message,
   wherein the cooperation response message further includes information on the CC between terminals including the first terminal and the second terminal,
   wherein the information on the CC includes an execution mode, and
   wherein the execution mode includes one of a first mode in which data is transmitted through relaying between the terminals or a second mode in which at least two or more terminals simultaneously transmit data.

* * * * *